(12) United States Patent
Pouliot et al.

(10) Patent No.: US 7,634,966 B2
(45) Date of Patent: Dec. 22, 2009

(54) REMOTE-CONTROLLED VEHICLE WHICH TRAVELS ON CONDUCTORS AND WHICH CAN PASS OVER OBSTACLES BY MEANS OF TEMPORARY SUPPORT ROTORS

(75) Inventors: Nicolas Pouliot, Montreal (CA); Serge Montambault, Ste-Julie (CA); Marco Lepage, St-Amable (CA)

(73) Assignee: Hydro-Quebec, Montreal, Quebec (CA)

( * ) Notice: Subject to any disclaimer, the term of this patent is extended or adjusted under 35 U.S.C. 154(b) by 505 days.

(21) Appl. No.: 10/544,401

(22) PCT Filed: Feb. 4, 2004

(86) PCT No.: PCT/CA2004/000148

§ 371 (c)(1),
(2), (4) Date: Aug. 3, 2005

(87) PCT Pub. No.: WO2004/070902

PCT Pub. Date: Aug. 19, 2004

(65) Prior Publication Data

US 2006/0150857 A1 Jul. 13, 2006

(30) Foreign Application Priority Data

Feb. 4, 2003 (CA) .................................. 2418473

(51) Int. Cl.
*B61B 7/00* (2006.01)
(52) U.S. Cl. ..................................................... 104/112
(58) Field of Classification Search ................. 104/112, 104/113, 115, 116
See application file for complete search history.

(56) References Cited

U.S. PATENT DOCUMENTS 6,412,420 B1 * 7/2002 Kramer et al. .............. 104/182
6,494,141 B2 * 12/2002 Montambault et al. ...... 104/112

FOREIGN PATENT DOCUMENTS

| JP | 0320711 | 10/1991 |
| JP | 06327112 | 11/1994 |
| JP | 10248130 | * 9/1998 |

* cited by examiner

*Primary Examiner*—S. Joseph Morano
*Assistant Examiner*—Robert J McCarry, Jr.
(74) *Attorney, Agent, or Firm*—Baker & Hostetler LLP

(57) ABSTRACT

A remote-controlled vehicle adapted to be mounted on at least one conductor and to pass over an obstacle encountered thereon. The vehicle includes: a frame, inspection systems, motors used to move the vehicle, a remote control system, at least two carrying arms pivotally mounted to the frame and exerting a pressure in the direction of the conductor(s) for suspending the frame to the conductor(s) and two opposing wheels attached to each carrying arm in order to enable the vehicle to travel along said conductor(s) while suspended. The axis of rotation of each of the wheels is inclined in relation to the vertical axis and at least one of the wheels is actuated by the motors. At least one temporary support rotor is equipped with at least two pivoting blades disposed above the corresponding conductor in order to temporarily support the vehicle when one of the wheels encounters an obstacle.

12 Claims, 22 Drawing Sheets

REMOTE-CONTROLLED VEHICLE WHICH TRAVELS ON CONDUCTORS AND WHICH CAN PASS OVER OBSTACLES BY MEANS OF TEMPORARY SUPPORT ROTORS

FIELD OF THE INVENTION

The present invention relates to an important improvement to the family of small remote controlled vehicles (also know as ROV's or "Remotely Operated Vehicles") which are adapted to travel on aerial conductors such as those used in the field of transmission of electrical energy and which may or may not be under live electrical conditions. In particular, the invention relates to mechanical carriers that are used to transport sensors or existing equipment so as to have access to different parts of said conductor.

BACKGROUND OF THE INVENTION

The present world context regarding the exploitation of an electrical energy transmission network is the following: ageing components, increasing demand for energy, deregulation and opening of markets, increasing pressure by clients for quality and reliable energy. The electrical utilities are therefore required to know precisely the state of their transmission network in order to apply the principles of preventive maintenance for safekeeping the reliability of the systems. The evaluation of the state of a component is evaluated, inter alia, through measurements by means of sensors. With regard to the gathering of information, numerous sensors have been developed but the positioning of these sensors, in order to access the components, often remains an important challenge. The use of remote-controlled vehicles (ROV) for this task in order to achieve the inspection of circuits of conductors is therefore very appropriate.

Many vehicles of the ROV type have been developed in the past. A quick overview will bring to the fore the characteristics and disadvantages of the main ones.

Referring to FIG. 1, there is shown a remote-controlled line chariot for the inspection of circuits with a simple conductor and which is the object of U.S. Pat. No. 6,494,141 (MONTAMBAULT et al.) This remote-controlled vehicle is very efficient, compact, relatively light and easy to use. It also has a good traction force which renders it very versatile. It is a third generation prototype that has proven many times over its efficiency, its mechanical robustness and its robustness to work under live electrical conditions (315 kV, 1000 A). It allows the de-icing of overhead ground wires and of conductors, thermographic and visual inspections and the measurement of the electrical resistance of joints. It travels on simple conductors regardless of their diameters. However, this type of ROV is only capable to pass over mid-span tension joints, but cannot pass over on its own pylons or vibration dampers or spacers. It has to be dismantled when it reaches an insurmountable object and has to be put back together again on the other side of the obstacle.

Referring to FIGS. 4 and 5, there are shown different chariots used for the evaluation of a level of corrosion in steel cables or that allow to carry out the method of "pulleys-cradles". FIG. 4 shows a chariot commercialized by the firm Furukawa. FIG. 5 shows another similar chariot made by the firm Fujikura. These chariots use old technologies. In fact, the chariots use two wheels with a motor. They have a very low traction force. They cannot work with under live electrical conditions. They travel on a simple conductor, without being able to pass over pylons or spacers.

Referring to FIG. 6, there is shown a robot for installing warning markers. It is a voluminous and heavy prototype. It is dedicated to the installation of warning markers on overhead ground cables (in general).

The above-mentioned concepts may sometimes be efficient for certain precise tasks but are often heavy, sometimes fragile and may rarely work under live electrical conditions. However, the principal disadvantage of these concepts is their inability to pass over obstacles that are located on the conductors, such as vibration dampers, and even less to change spans by passing over the elements which hold the conductor to each pylon. They are therefore all restricted to intervene only between two pylons or to be removed and then reinstalled on the other side of the insulator strings by a human operator. One can therefore easily imagine the advantage of providing an ROV concept that could be used on many spans to inspect, for example, several kilometers of conductors without requiring direct human intervention.

Other concepts, having in particular the same object, have however been developed. Indeed, below, there are described some experimental prototypes for passing over obstacles on simple conductors.

Referring to FIGS. 2 and 3, there is shown prototypes or concepts that can travel on a simple conductor and can pass over pylons (insulator strings and vibration dampers). FIG. 2 shows a prototype by the firm TVA (Tennessee Valley Authority). FIG. 3 shows another prototype by NSI-NASA (Sewada et al.) These apparatus are very large, very complex and difficult to install. It is not clear if they are able to work under live electrical conditions. It seems that these apparatus were not developed in consultation with the eventual users because they are much too large and complex to be usable in a network in a reliable manner. The speed of passing over the obstacles is not fast, because of the complexity of the mechanisms that are used. The price of these apparatus is possibly disadvantageous because of the complexity of the systems.

Referring to FIGS. 7 and 8, there is shown respectively a motorized aerial basket (Hydro-Quebec TransEnergie) and one that is non-motorized (Italy). These prototypes are not vehicles of the ROV type because they are used to transport linemen as they are mounted on conductors. These concepts allow them to move on the conductor bundles and to pass over the spacers and pylons (insulator strings). The mounted operator must then activate levers and to deploy on his own certain supplementary wheels in order to have enough support on each side of the obstacles. The operation requires a relatively long time.

SUMMARY OF THE INVENTION

The present invention manages to reconcile the advantages of each of the above-described categories of vehicles by achieving the passing over of obstacles in an easy, fast and reliable manner.

The present invention therefore relates to a remote-controlled vehicle adapted to be mounted on at least one conductor cable and for passing over an obstacle on said at least one conductor, the vehicle comprising:
 a frame;
 inspection systems mounted on the frame for inspecting the one or more conductors;
 motor means for displacing the vehicle on the one or more conductors;
 a remote control system for controlling the inspection systems and the motor means;
 at least two carrying arms positioned on opposite sides of the one or more conductors, the carrying arms being pivotally attached to the frame and exerting a pressure in a direction of the one or more conductors for suspending the frame onto the one or more conductors;

at least two opposing wheels, each wheel being attached to each carrying arm for enabling the vehicle to travel along the one or more conductors while maintaining the vehicle suspended, each wheel having an axis of rotation that is inclined with respect to a vertical axis, at least one of said two wheels being activated by the motor means; and at least one temporary support rotor provided with at least two pivoting blades which are disposed above the corresponding conductor for temporarily supporting the vehicle when one of the wheels encounters the obstacle;

thereby, in use, when the vehicle travels on the one or more conductors and one of the wheels encounters the obstacle and looses contact with the one or more conductors, the blades temporarily lean on the conductor and/or the obstacle and support the vehicle so as to prevent the vehicle from falling and then allow the wheels to contact once again the one or more conductors once the obstacle is passed over.

Preferably, the temporary support rotor has three blades distributed all around the disk of the rotor. This rotor may be coaxially mounted on one of the wheels and pivots independently with respect to the wheel on which the rotor is mounted. The rotor may also be provided with a passive indexation position system or a return spring that maintains a reference position of the blades when approaching the obstacles. The carrying arms may be provided with spring systems in order to exert the required pressure.

The invention as well as its numerous advantages will be better understood by the following non-restrictive description of preferred embodiments of the invention made in reference to the appended figures.

DETAILED DESCRIPTION OF THE INVENTION

Figure 1:
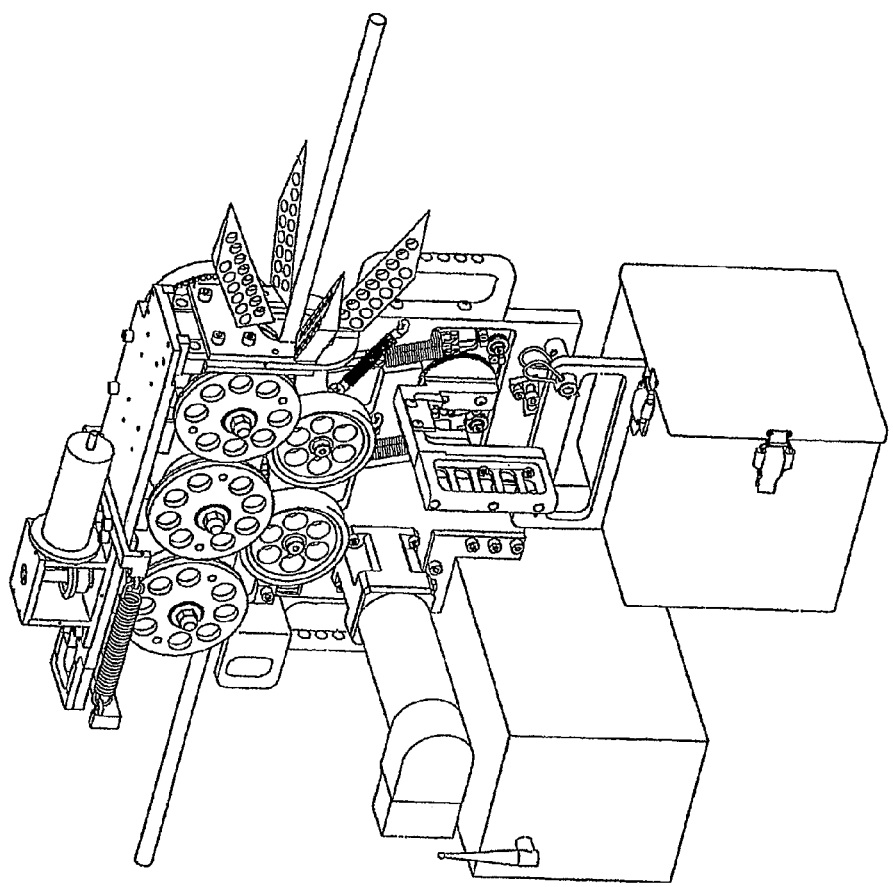
FIGS. 1 to 8 are perspective views of different apparatus known in the prior art and that are adapted to be mounted on conductor cables.
Figure 2:
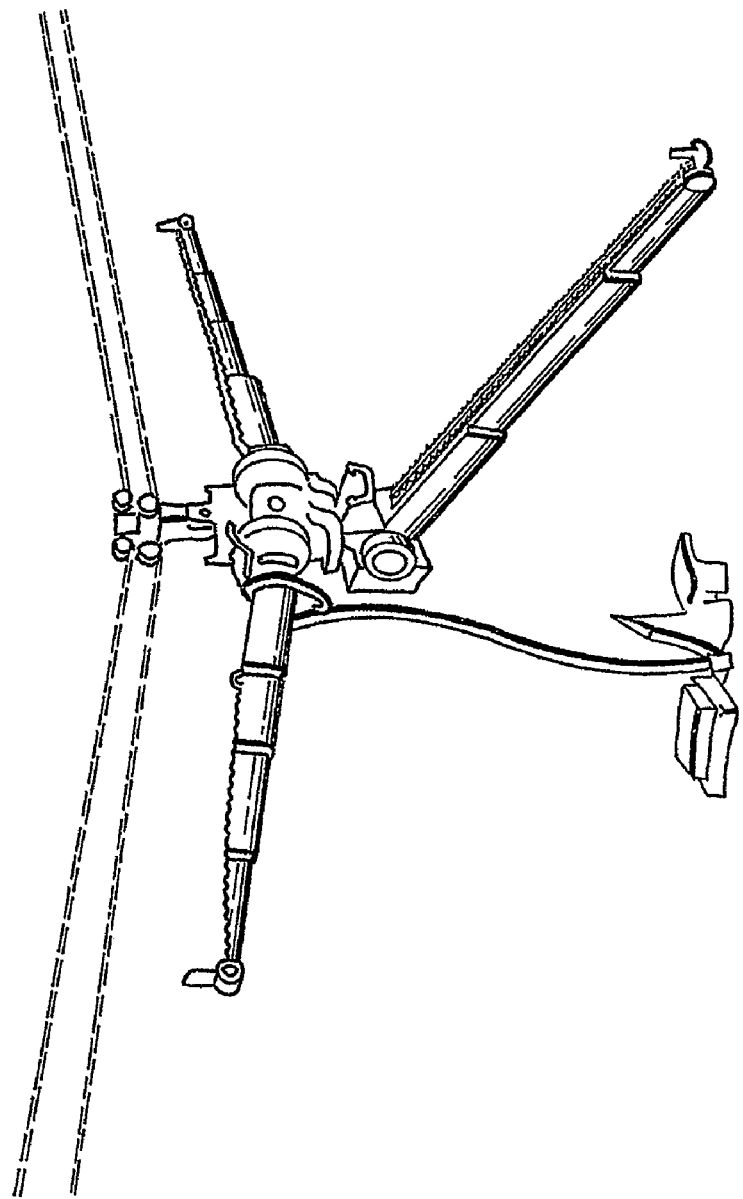
Figure 3:
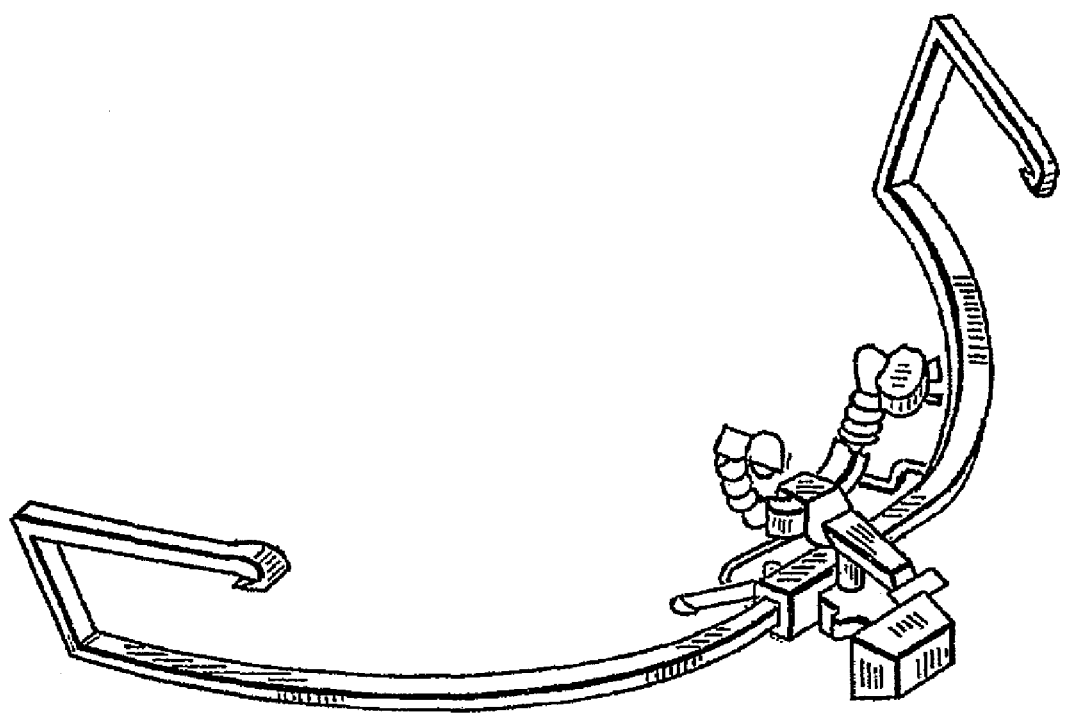
Figure 4:
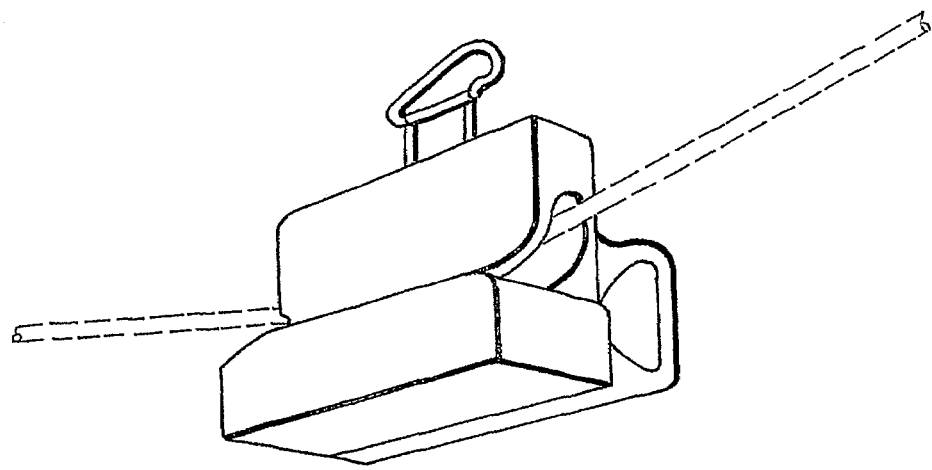
Figure 5:
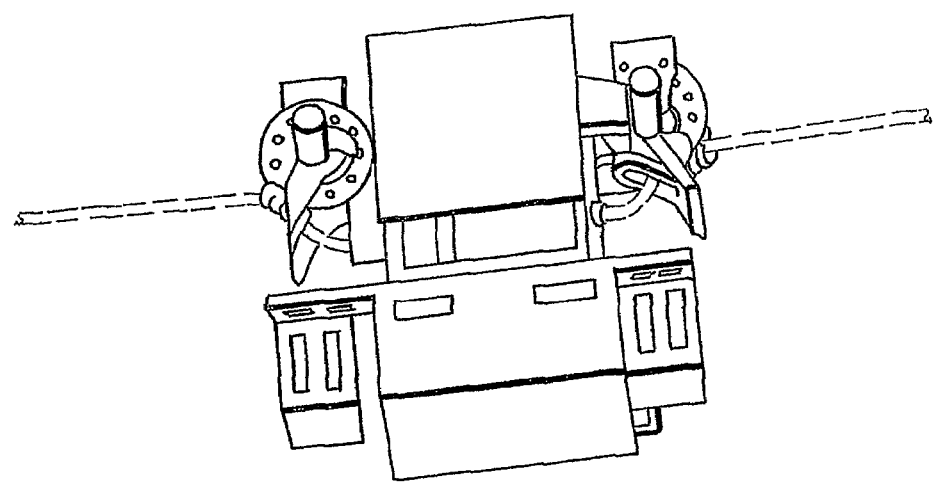
Figure 6:
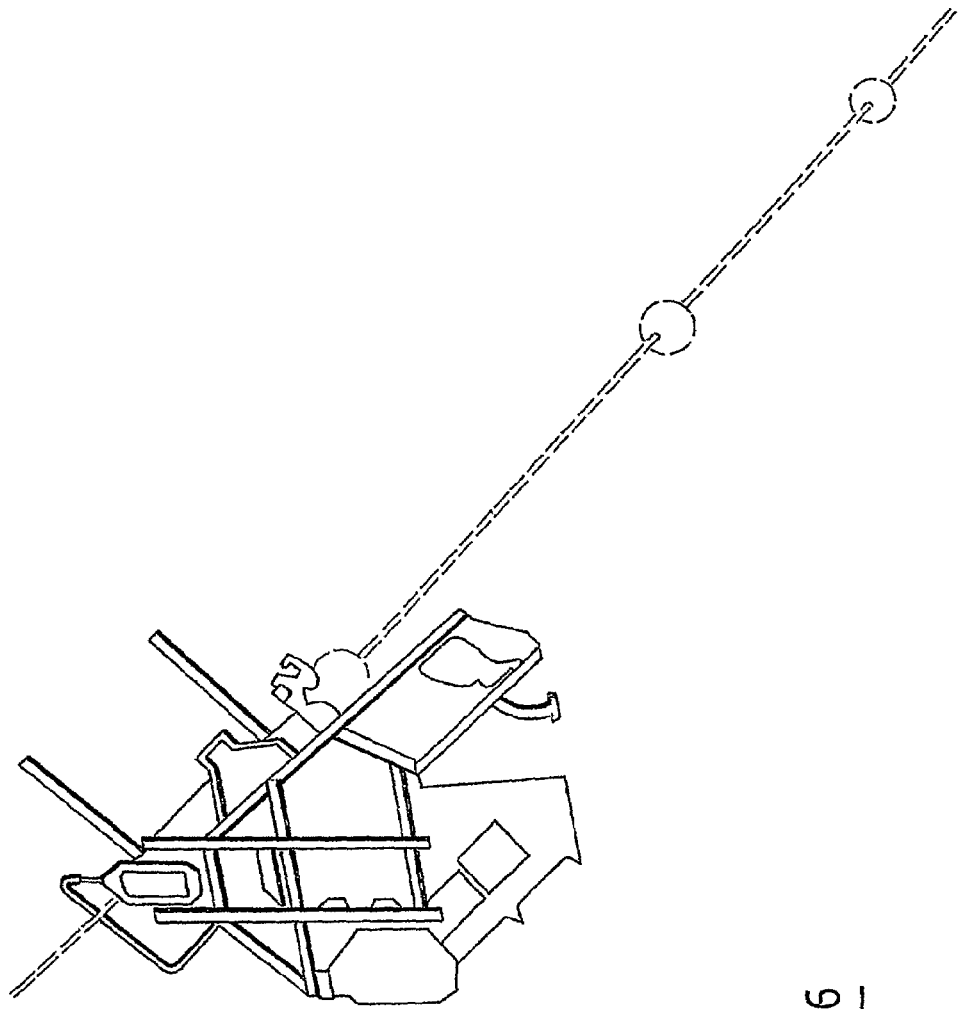
Figure 7:
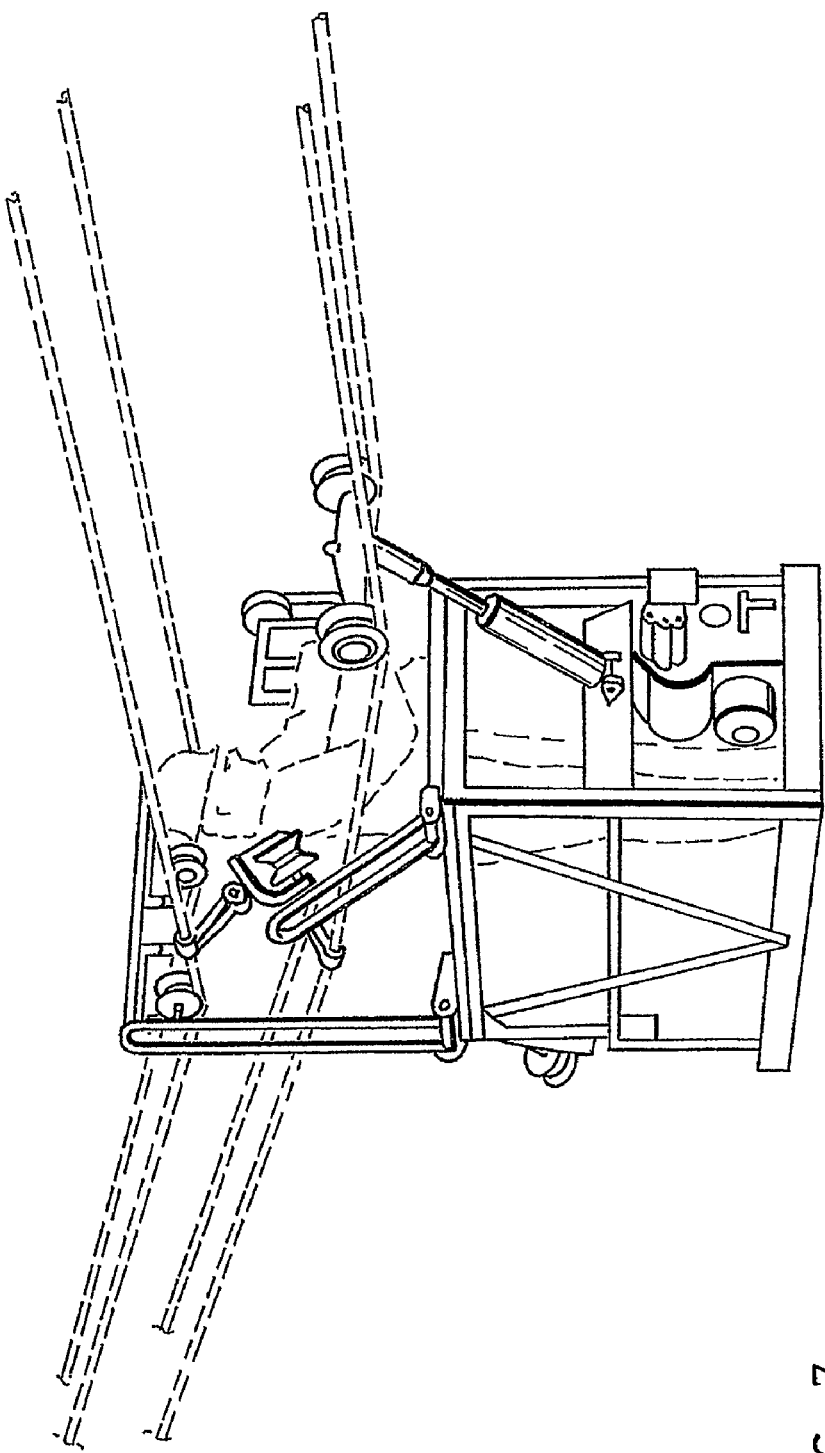
Figure 8:
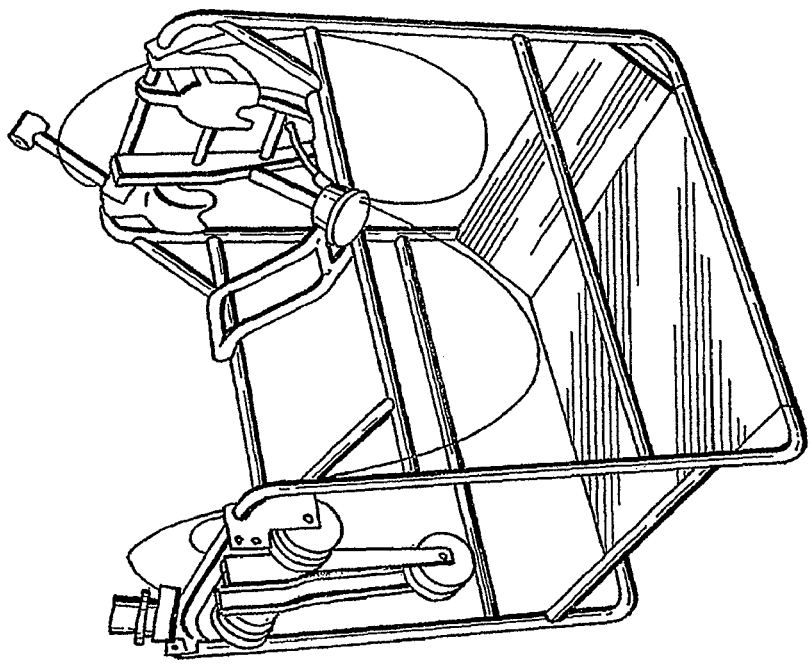

Referring to FIGS. 9 to 20, there is shown a remote-controlled vehicle 1 adapted to be mounted on at least one conductor cable 3 and for passing over an obstacle 5 on the one or more conductors 3, according to a preferred embodiment of the invention. The vehicle 1 includes a frame 7, inspection systems 9, 10 mounted on the frame 7 for inspecting the one or more conductors 3, motor means 11 for moving the vehicle 1 on the one or more conductors 3, a remote control system 13 for controlling the inspection systems 9, 10 and the motor means 11, and at least two carrying arms 15 positioned on opposite sides of the one or more conductors 3. The carrying arms 15 are pivotally attached to the frame 7 and exert a pressure in the direction of the one or more conductors 3 for suspending the frame 7 onto the one or more conductors 3. The vehicle 1 also has at least two opposite wheels 17. Each wheel 17 is attached to each carrying arm 15 for allowing the vehicle 1 to travel along the one or more conductors 3 while maintaining the vehicle 1 suspended. Each wheel 17 has an axis of rotation that is inclined with respect to a vertical axis and at least one of the two wheels 17 is activated by the motor means 11. The vehicle 1 further includes at least one temporary support rotor 19 provided with at least two pivoting blades 21 positioned above the corresponding conductor 3 for temporarily supporting the vehicle 1 when one of the wheels 3 encounters the obstacle 5. Thereby, in use, when the vehicle 1 travels on the one or more conductors 3 and one of the wheels 3 encounters the obstacle and looses contact with the one or more conductors 3, the blades 21 temporarily lean on the conductor 3 and/or the obstacle 5 and support the vehicle 1 so as to prevent the vehicle from falling and then allow the wheels 3 to contact once again the one or more conductors 3 once the obstacle 5 is passed over.

The aerial electrical conductors 3 on which travels the vehicle 1 may or may not be connected to electrical power and carry a current. The fundamental particularity of this vehicle 1 is that is has the capacity to pass over in a very simple, autonomous and reliable manner the obstacles 5 that are present on the conductors 3. These obstacles 5 are namely vibration dampers of different types, spacers in the case of conductor bundles and especially suspension elements (clamps and insulator strings) that are present on each pylon and that are used to support the one or more conductors 3. This vehicle 1 can therefore be used to transport in a remote-controlled and/or autonomous manner a multitude of sensors used for the inspection and for the maintenance of line components (cameras, measurement instruments, etc.) and on several spans, thereby covering a large distance.

The principal application of the prototype according to a preferred embodiment of the present invention is for a quadruple conductor bundle 3, such as those used on the Hydro- Québec network for lines at 735 kV. It is in fact firstly for this configuration of conductors that the concept was experimentally validated by means of a functional prototype, which is shown on FIG. 16. Therefore, the figures illustrating the concept are taken from this type of application. However, as it will be seen further below, the invention that is claimed is general enough to be adapted to many other types of configuration circuits, either for a single conductor, or for bundles of two, three, four or six conductors.

Figure 9:
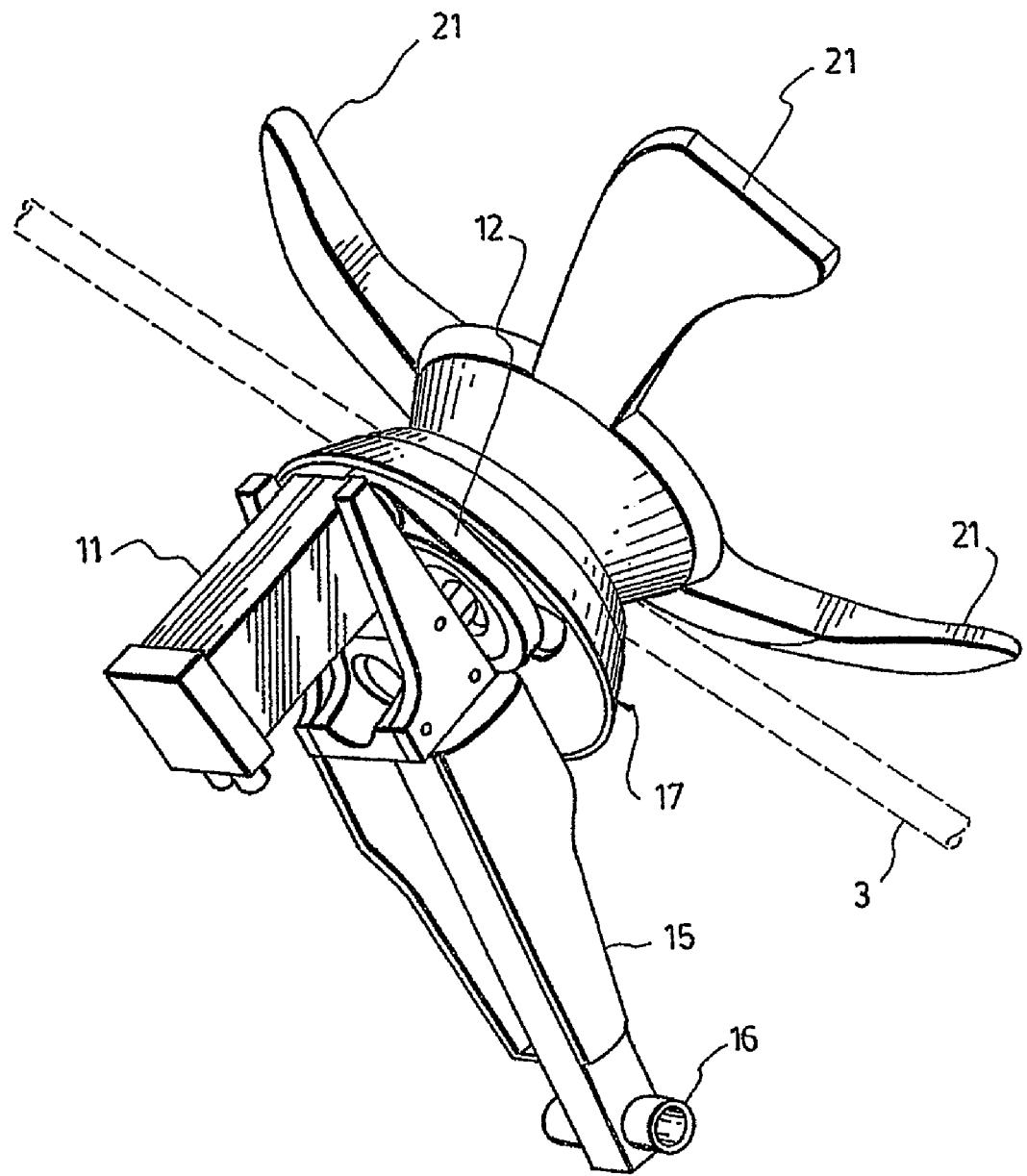
FIG. 9 is a partial perspective view of a carrying arm and a temporary support rotor mounted on a conductor cable according to a preferred embodiment of the present invention.
Figure 10:
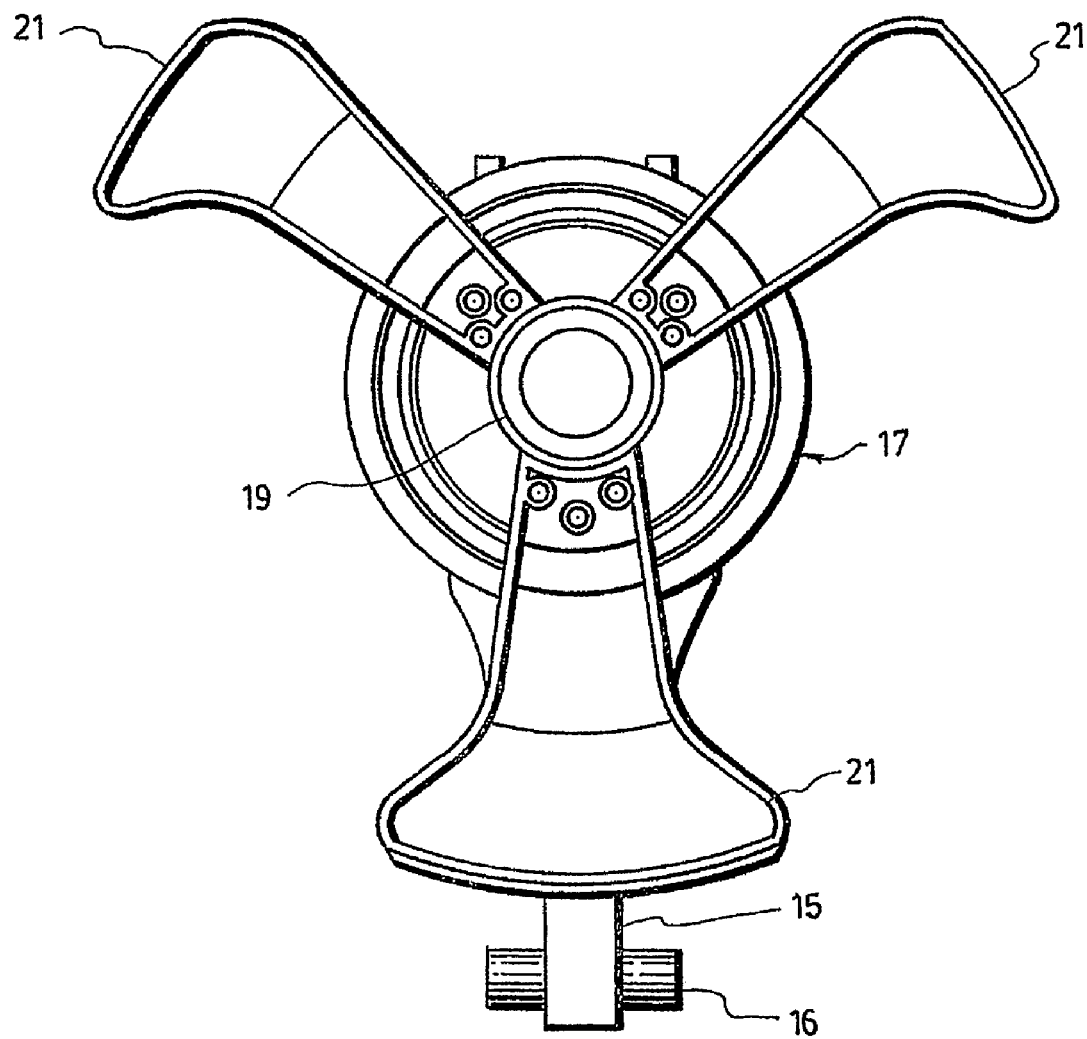
FIG. 10 is a top view of the carrying arm and of the temporary support rotor shown in FIG. 9.
Figure 11A:
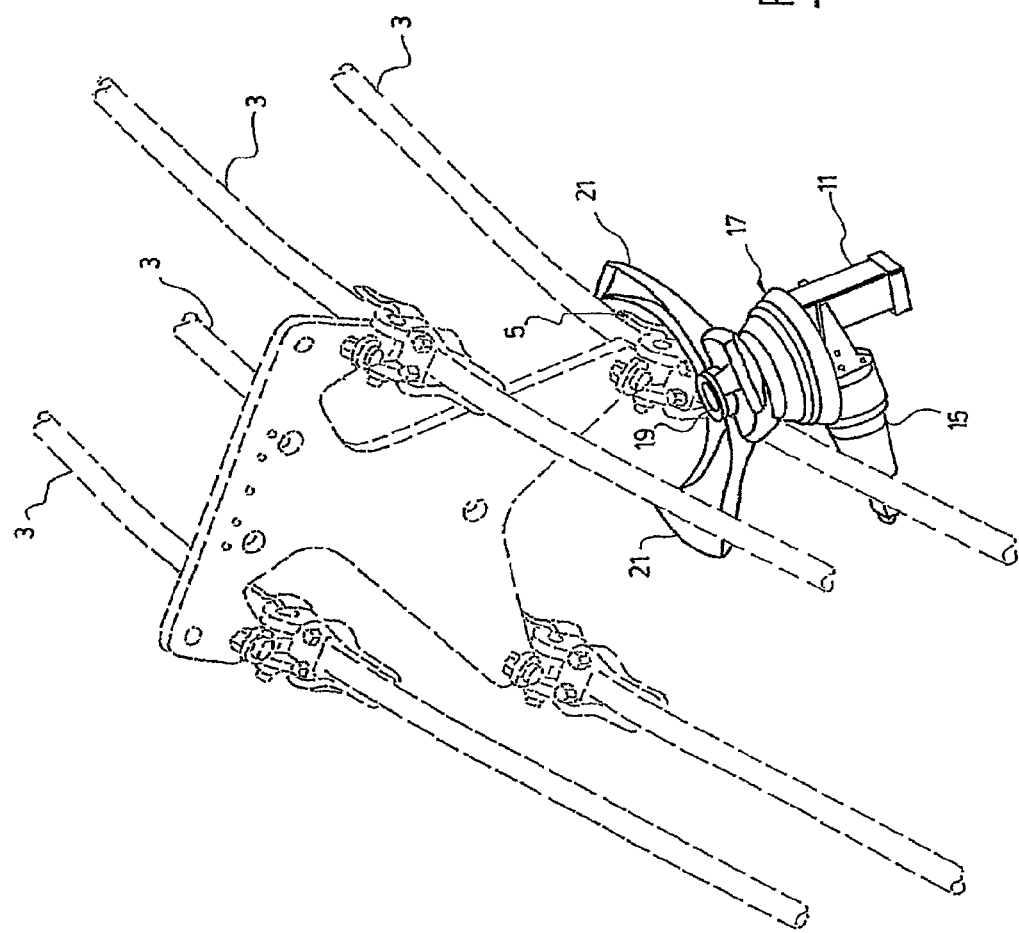
FIGS. 11A, 11B, 11C and 11D are partial perspective views of the carrying arm and temporary support rotor shown in different stages while passing over an obstacle on the conductor cable.
Figure 11B:
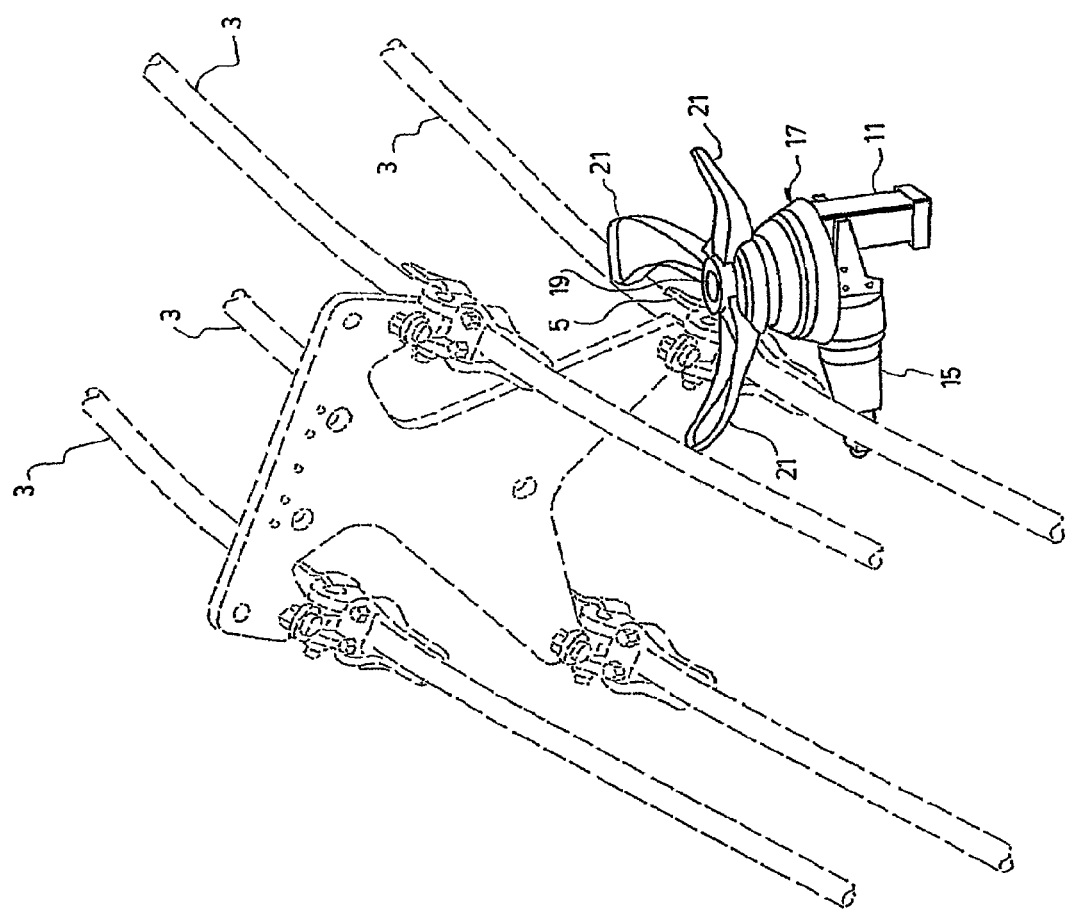
Figure 11C:
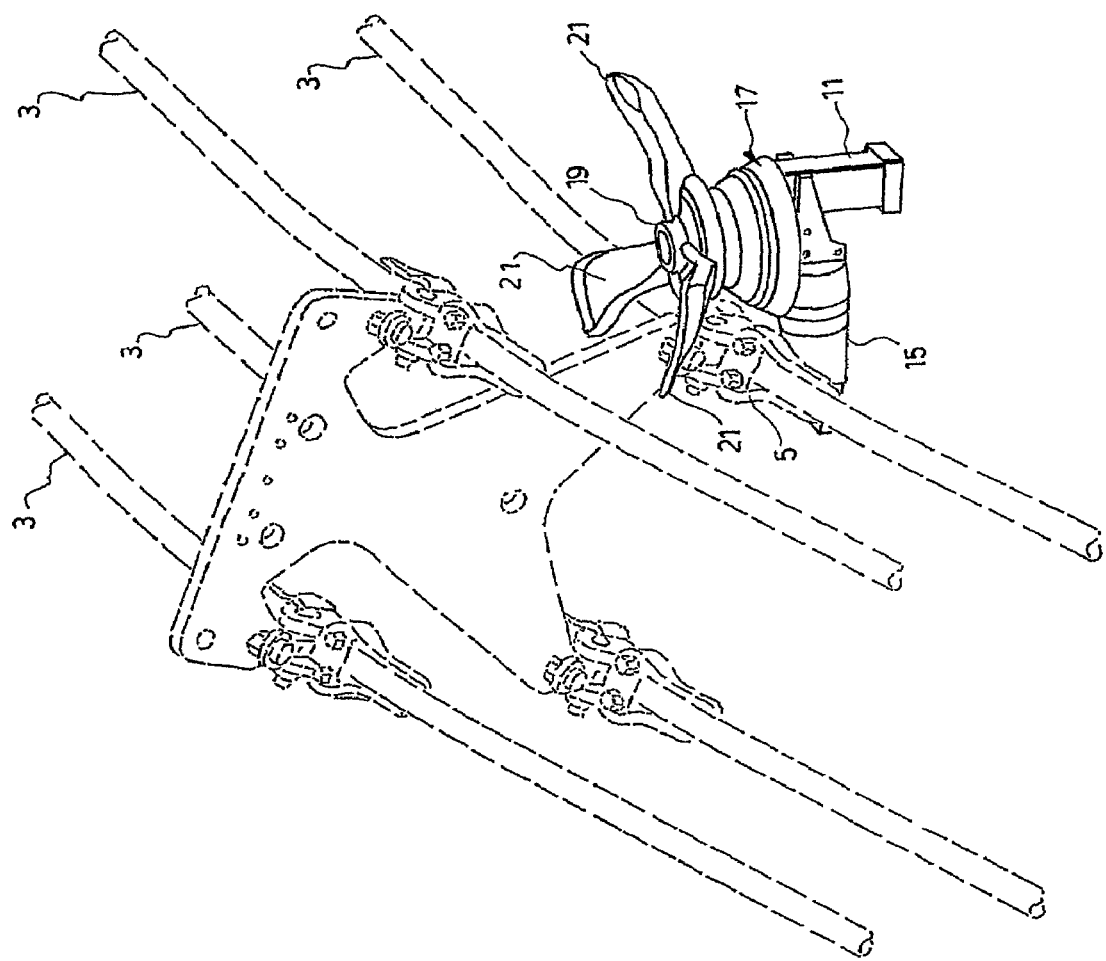
Figure 11D:
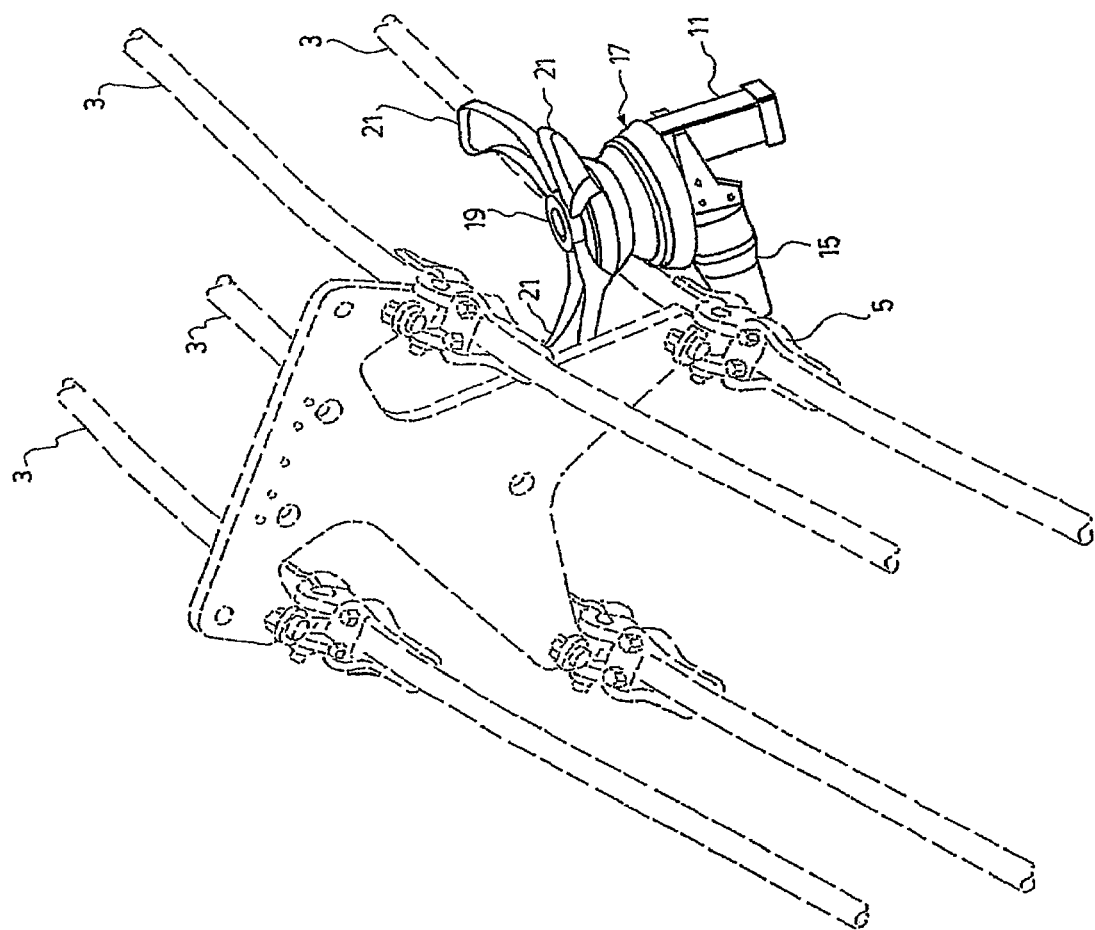
Figure 12:
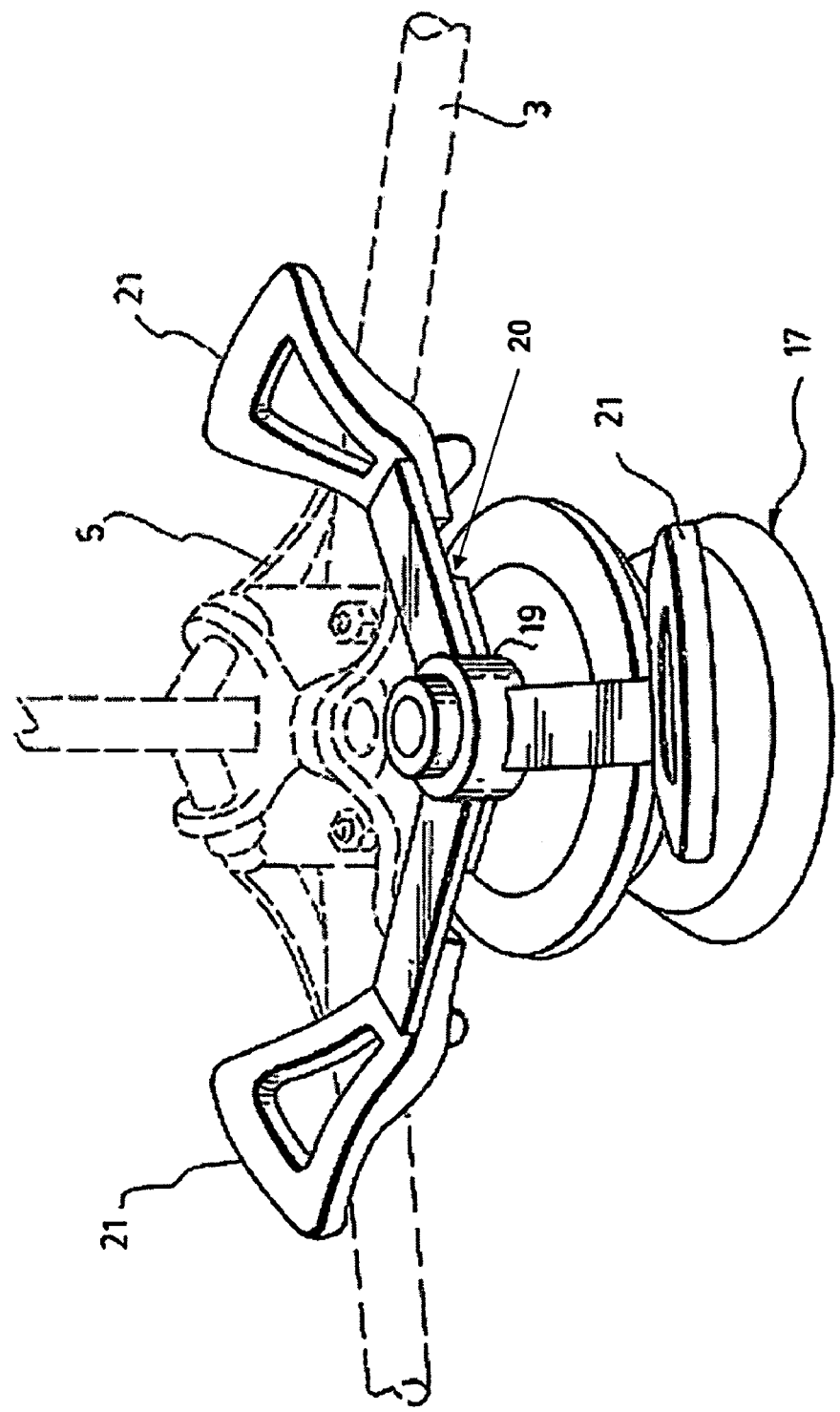
FIG. 12 is a perspective view of a temporary support rotor that is leaning on a clamp of a conductor according to a preferred embodiment of the present invention.

Referring to FIG. 9, there is shown certain elements that are in this case carried by a carrying arm 15 that is independently connected to the frame 7 of the vehicle 1. There is shown a wheel 17 that is held against the conductor 3 in a very inclined manner with respect to a vertical axis and that is pushed against the conductor 3 by means of springs 29 (see FIG. 16) that pull on the carrying arm 15, which can then pivot around pivot 16 which is parallel to conductor 3, in order to increase the available traction force and to increase the stability of the hold on the conductor 3. The wheel 17 may be a drive wheel in order to provide traction on the conductors 3 or it can also act as a passive pressure wheel. In the case where the wheel 17 is a drive wheel, it is preferable to have a traction motor 11 for each drive wheel. This motor 11 is mechanically connected to the wheel 17 by means of gears or a speed reducing belt 12.

Figure 13:
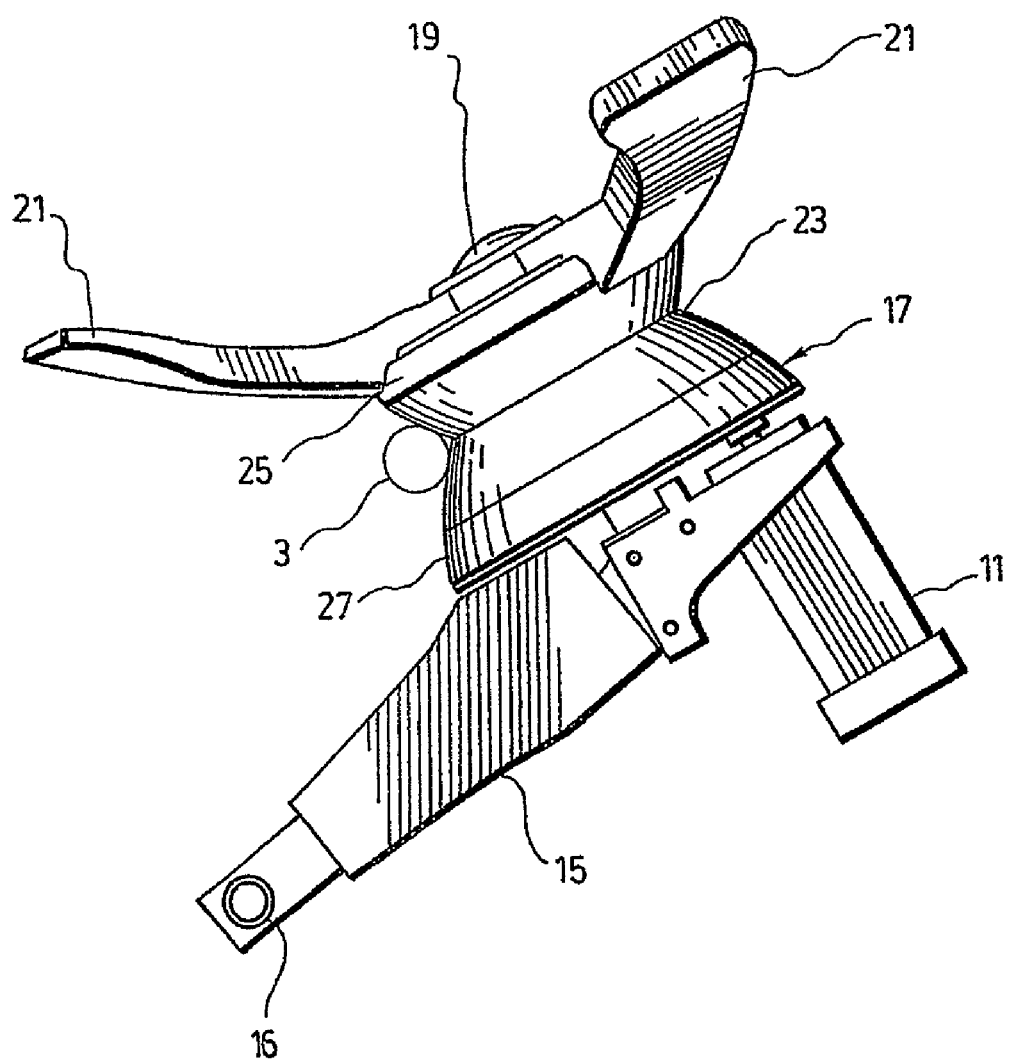
FIG. 13 is a partial side view of the carrying arm and of the temporary support rotor shown in FIG. 9.

Referring to FIG. 13, the carrying arm 15 also includes a rotor 19, which also has a very inclined rotation axis, and at least two blades 21 whose plane passes above the one or more conductors 3. These rotors 19 are preferably coaxially mounted with the wheels 17, which may be traction or pressure wheels. The function of these temporary support rotors 19 is to temporarily support the vehicle 1 or a part of the vehicle when some of the wheels 17 pass over an obstacle and risk to slide and loose contact with the conductors 3. The blades 21 of these rotors 19 are therefore correspondingly dimensioned with the dimensions of the obstacles 5 and the encounter of one of the blades 21 of the rotor 19 with the obstacles 5 starts the rotation of the rotor 19 so that the next blade 21 passes over the obstacle 5 and goes on to lean on the conductor 3. Once the obstacle 5 is passed over, the wheel 17 is guided by the blades 21 of the one or more rotors 19 towards the one or more conductors 3 and once again it is leaned against it. This sequence of events is schematically illustrated by FIGS. 11A to 11D and 12 that only show the elements related to a single carrying arm 15.

The temporary support rotors 19 may include a passive indexation position system (not illustrated) or a return spring 20 that maintains a reference position of the blades when approaching the obstacles so as to ensure that they return to that position or to an equivalent position once the obstacle 5 is passed over. In the embodiment depicted in FIG. 12, the return spring 20 produces a leaf spring effect. The rotation of the rotor 19 is therefore not activated by a motor.

Preferably, the shape of the wheels 17, as the one shown in FIG. 13, allows accommodating different diameters of conductors 3 by means of a profile having a central groove 23 and a rounded edge 25 for facilitating the passing of the obstacles 5. The wheel 17 may be preferably made of rubber of low hardness in order to maximize the friction coefficient and the performances on a humid conductor. The wheels 17 may also be made of polyurethane but this material is less efficient on humid conductors. A metallic additive may be incorporated in the rubber in order to increase the electrical conductivity of the vehicle 1. The external edge 27 of the wheels 17 may be rounded and made of plastic material so as to provide not much traction on the obstacles that are passed over for ensuring that the conductor 3 slides and comes back to its position in the middle of the central groove 23 once the obstacle 5 is passed over.

Preferably, each of the motors 11 include a control system of the speed and motor or traction force in order to adjust the speed of the vehicle 1.

Figure 14:
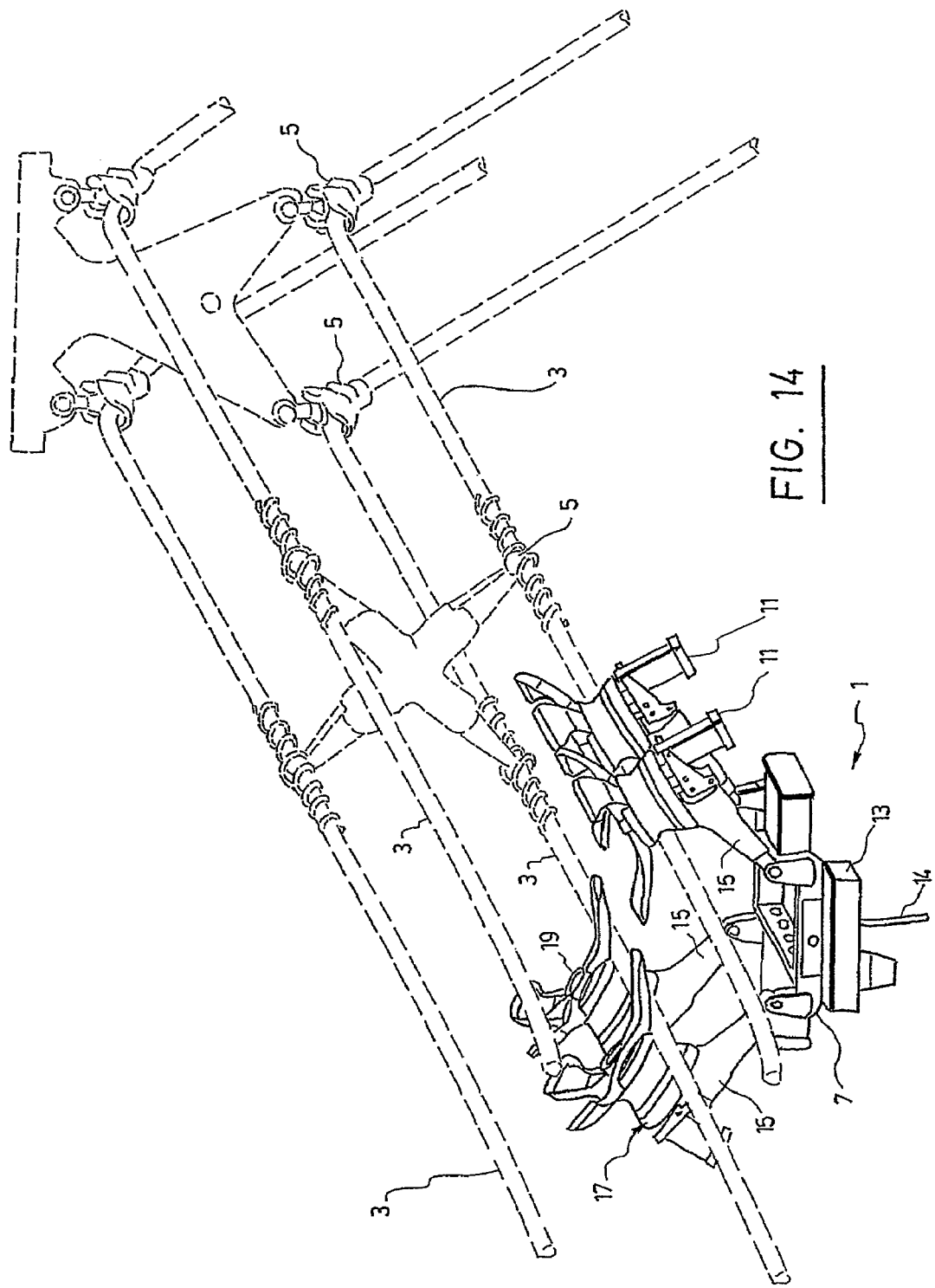
FIG. 14 is a perspective view of a remote-controlled vehicle mounted on two inferior conductor cables of a bundle of four conductors and provided with four temporary support rotors, before the passage of a spacer, according to a preferred embodiment of the present invention.
Figure 15:
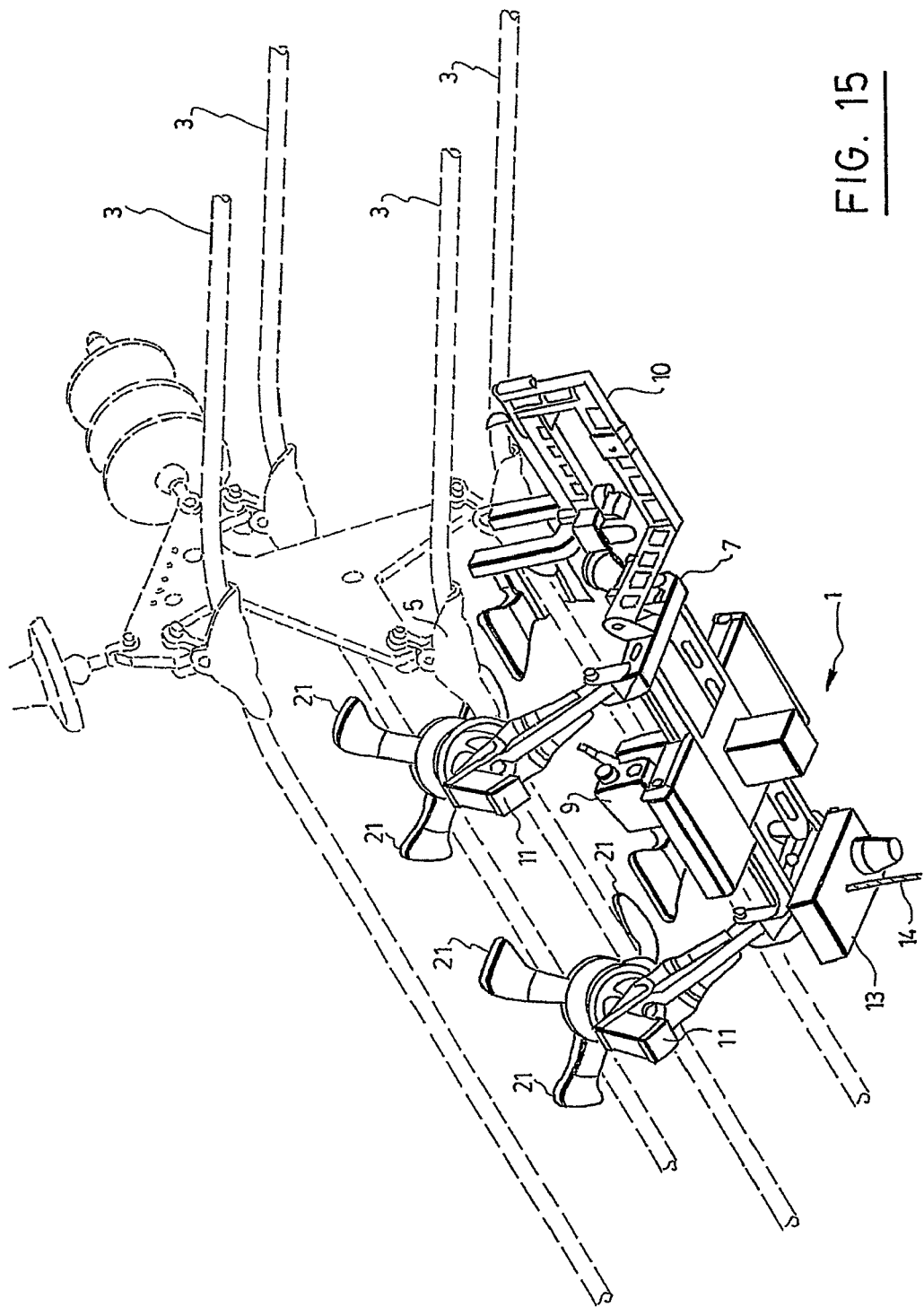
FIG. 15 is a perspective view showing the bottom of the remote-controlled vehicle shown in FIG. 14.
Figure 16:
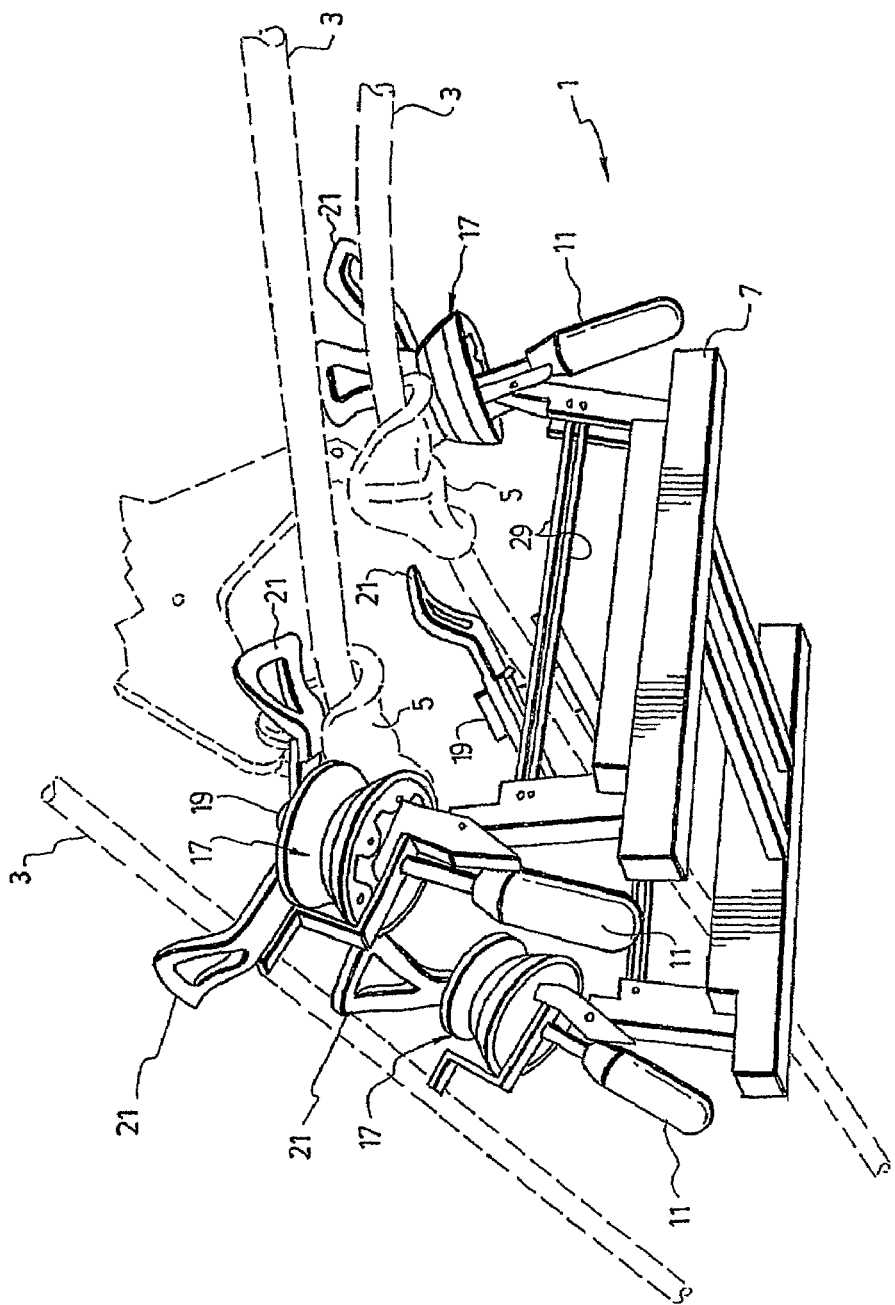
FIG. 16 is a perspective view of a remote-controlled vehicle provided with temporary support rotors for a quadruple bundle according to a preferred embodiment of the present invention.

Referring to FIGS. 14, 15 and 16, there is shown a first application of the vehicle TSR (temporary support rotor) that is adapted to travel on a quadruple bundle of conductors 3, by resting on the two conductors 3 on the bottom. This vehicle 1 has the same characteristics described above and joins four identical arms to a common frame 7. The vehicle 1 therefore includes four drive wheels 17 positioned in two pairs, therefore forming a front axle and rear axle. Temporary support rotors 19 are coaxially mounted on each of the wheels 17. Springs 29 biased between two arms 15 of a same axle apply a force that tends to bring them one against the other, thereby transferring a lateral contact force from the wheels 17 onto the conductors 3. Elastic bands or any other similar spring means may be used instead of the springs 29 in order to accomplish the same function, as it will be understood by persons skilled in the art.

FIG. 15 shows different sub-systems inherent to a complete functional and autonomous vehicle 1. Preferably, the one or more motors 11 used are of the electric type and are powered by batteries housed in housings. The batteries may be rechargeable such as the hydride metal nickel type. The power source chosen is sufficient for powering the installed accessories, such as the systems of cameras 9 or resistance measurement equipment 10. However, it is also possible to use a gas generator as a power source in order to obtain greater autonomy.

Preferably, the vehicle has mounted electronic 13 necessary for its good use as well as a telecommunication system for its remote control, with an antenna 14 and a frequency jump receiver. The mounted electronic equipments are protected from the electromagnetic fields by a Faraday cage and are optimized to achieve mechanical robustness.

The configuration of vehicle 1 itself may vary greatly, by recombining each of the different elements described above in order to adapt it to different type of conductors 3. A few figures are provided as examples, in order to illustrate the different possibilities.

Figure 17:
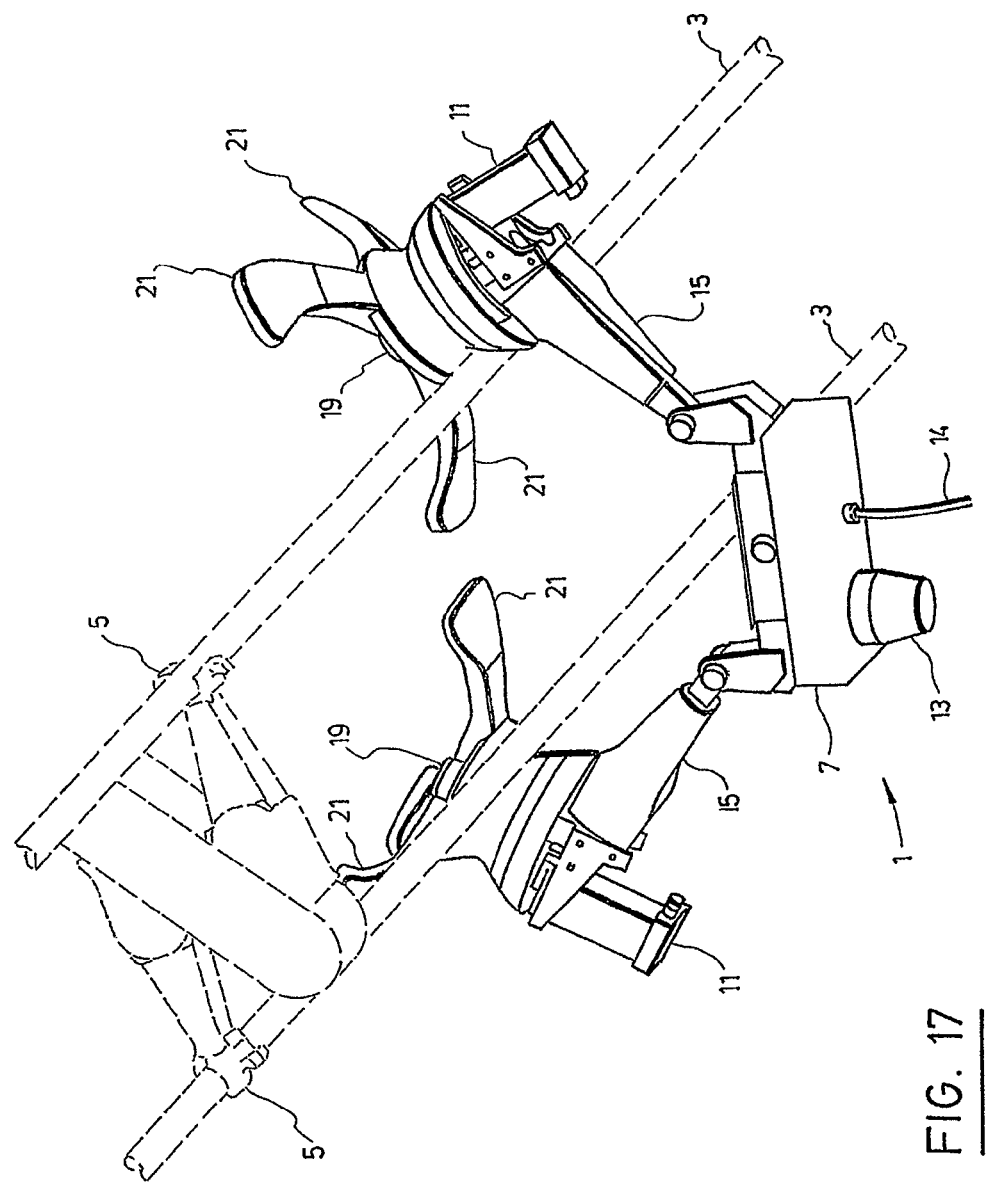
FIG. 17 is a perspective view of a remote-controlled vehicle provided with temporary support rotors adapted for a double bundle according to a preferred embodiment of the present invention.

It is possible, as shown in FIG. 17, to only have two carrying arms 15, and therefore two drive wheels 17 and two rotors 19. This concept is usable on double bundle and quadruple bundle, such as the four rotor version described above.

Figure 18:
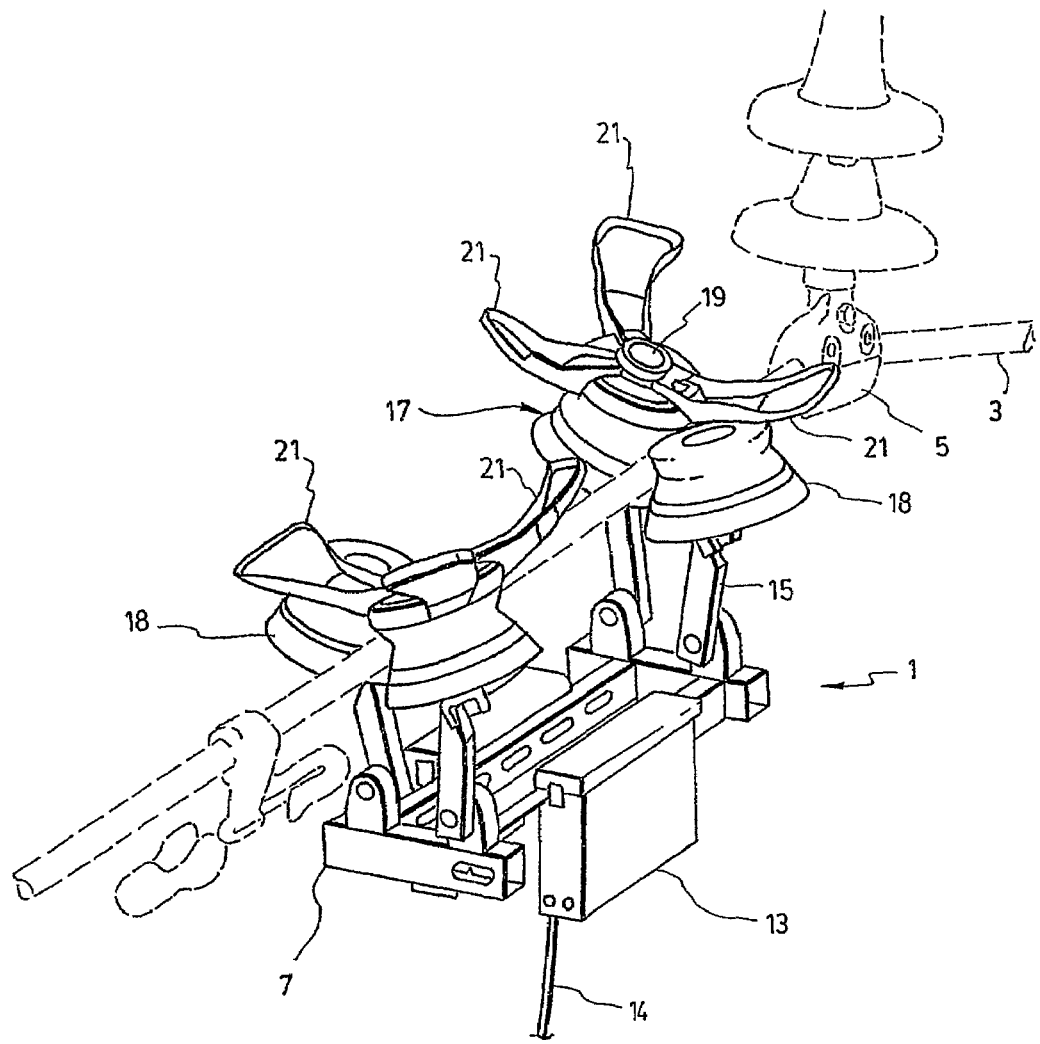
FIG. 18 is a perspective view of a remote-controlled vehicle provided with a temporary support rotor adapted for a simple conductor according to a preferred embodiment of the present invention.

One of the simplest but very interesting modifications of the TSR concept is shown in FIG. 18 and is meant to travel on a simple conductor 3 while passing over the obstacles 5, which are encountered thereon. One then always uses four pivoting carrying arms 15 but only two traction drive wheels 17 provided with two temporary support rotors 19 with blades 21. Thereby, two of the four arms 15 only support the pressure wheels 18 that may or may not be drive wheels. The shape of the pressure wheels 18 is somewhat different in order to conform with the shape of the traction wheels 17. This allows to properly position the conductor 3 in the groove of the traction wheels 17. Of course, one may adapt this principle of pressure wheels 18 for a vehicle 1 adapted to travel on conductor bundles 3 instead of a simple conductor 3.

Figure 19:
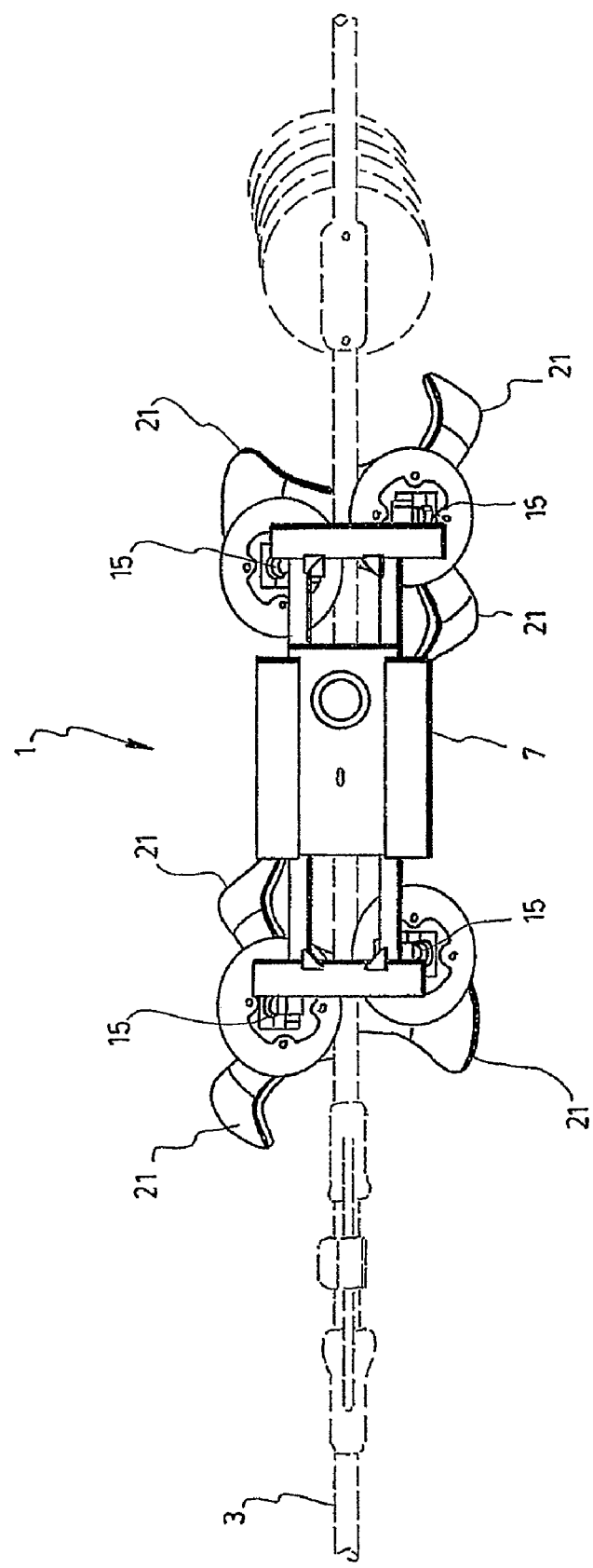
FIG. 19 is a bottom view of the remote-controlled vehicle shown in FIG. 18.
Figure 20:
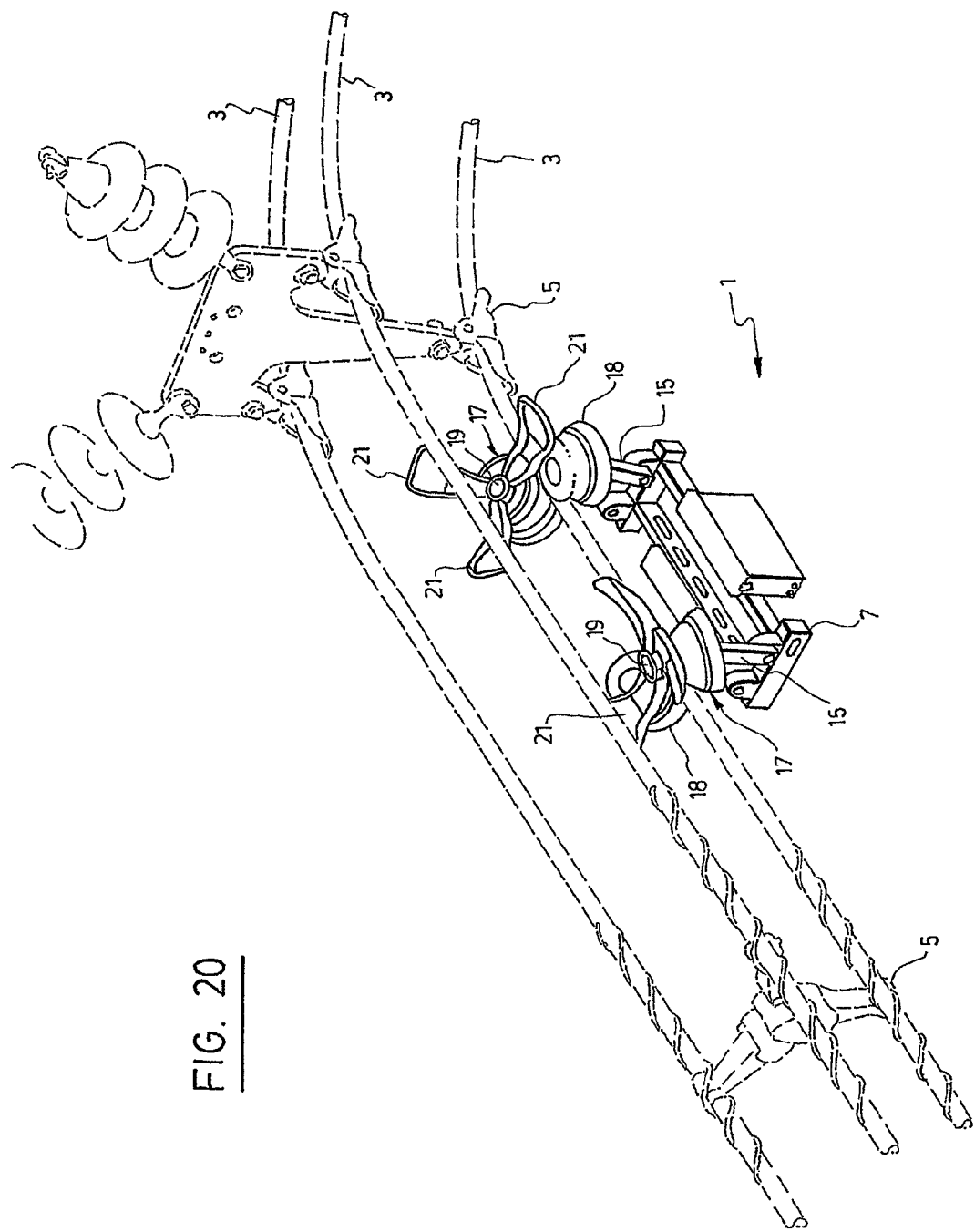
FIG. 20 is a perspective view of a remote-controlled vehicle provided with temporary support rotors adapted for a triple bundle according to a preferred embodiment of the present invention.

The carrying arms 15 of the pressure wheels 18 may be positioned in different planes than those of the traction wheels 17, as shown in FIG. 19.

The same concept may also be used on a triple bundle (see FIG. 20), by leaning onto the lower conductor. Lastly, other combinations are easily conceivable (not illustrated): for example, one may take out one pressure wheel 18 from the last concept presented above and position it in between the traction or drive wheels 17, which would then be both located on the same side of the conductor 3, both opposed to the pressure wheel 18.

Furthermore, even though the rotor 19 is preferably mounted directly on the top of one of the wheels 17, it is also conceivable that the rotor 19 be mounted directly on one of the carrying arms 15 and not on a wheel 17. It is also possible that the rotor 19 be mounted separately and directly on the frame 17 of the vehicle without being mounted on a wheel 17 or on a carrying arm 15 provided with a wheel 17. For example, the rotor 19 may be mounted on a carrying arm 15 that is not provided with a wheel and functions substantially in the same way as explained above.

Herein below there is described the performances and preferential advantages of the present invention. The practical conditions of use make it imperative to pass over the obstacles by means of a mechanical solution that is simple and reliable. The least amount of possible mobile pieces often implies lesser breakage risks. One also tries to minimize the use of electronics. One thereby obtains a product that satisfies the following criteria:

Mechanism allowing passing over obstacles without having to stop;
Possibility of stopping on an obstacle if it has to be inspected;
Mechanism that may pass over the obstacles by means of mechanical systems, thereby requiring a minimum of mounted electronics;
Mechanism allowing to pass over the obstacles while moving forward and moving backward;
Installation and secure displacement of the vehicle on the bundle: no possible fall and safekeeping of the integrity of the line components;
Robustness and reliability in view of use conditions (transport, mechanical shocks, etc.);
Robustness in view of unfavourable weather conditions (humidity, dust, snow, moderate winds and ambient temperature);
Good traction force of the chariot on humid conductors and even covered with ice (at least equal to its weight);
Reliability and electromagnetic compatibility of the electronics and of the telecommunication systems while under live electrical conditions (up to 765 kV-750 A);
Passing time of an obstacle which is very short (a few seconds).

The positive impact of such a vehicle may be noticed at several levels:

Facilitates the access to different spans and to difficult to reach components;
Evaluation of the aerial joints (a diagnostic of the state of the weak links of the network, which is up to now difficult to achieve, particularly on the bundle circuits);
Optimisation of the maintenance costs (optimal and objective maintenance decisions, less expensive work method, reduction of intervention time, on-site inspection while under live electrical conditions, minimizing of expensive taking of samples);
Minimizing of the planned service interruptions (new methods of working while under live electrical conditions) and not planned (better knowledge of the state of the network and preventive maintenance);
Increased reliability of the network by means of the archiving and follow up of the evolution of the state of the network;
Health and security of the workers by separating the operator from the danger zone;
Improvement in the productivity and the efficiency of the inspections.

Although the present invention has been described above by preferred embodiments thereof, it is to be understood that the invention is not limited to these precise embodiments and that various changes and modifications may be effected therein without departing from the scope or the spirit of the present invention.

The invention claimed is:

1. A remote-controlled vehicle for travelling on aerial conductors, comprising:
a frame;
inspection systems mounted on the frame for inspecting at least one conductor;
motor means for displacing the vehicle on said conductor;
a remote control system for controlling the inspection systems and the motor means;
at least two carrying arms located on opposite sides of said conductor, the carrying arms being pivotally attached to the frame and exerting a pressure in a direction of said conductor so as to enable the frame to be suspended from said conductor;
at least two opposing wheels, each wheel being attached to each carrying arm for enabling the vehicle to travel along said conductor while maintaining the vehicle suspended therefrom, each wheel having an axis of rotation that is inclined with respect to a vertical axis, at least one of said two wheels being activated by the motor means; and
at least one temporary support rotor mounted with one of the wheels and provided with at least two pivoting blades, disposed above the corresponding conductor, for temporarily supporting the vehicle,
wherein, when the vehicle travels on said conductor and one of the blades encounters an obstacle, the rotor starts to rotate so that another one of the blades passes over the obstacle and temporarily rests on the conductor and/or the obstacle and supports the vehicle, causing the respective wheel to temporarily loose contact with said conductor, and, once the wheel passes over the obstacle, the blades guide the respective wheel towards said conductor so as to contact said conductor once again.

2. The vehicle according to claim 1, wherein each temporary support rotor comprises three blades distributed around each rotor.

3. The vehicle according to claim 1, wherein each rotor is coaxially mounted on each wheel and independently pivots with respect to the wheel on which the rotor is mounted.

4. The vehicle according to claim 1, wherein said at least two carrying arms are biased by spring means that tend to bring together the carrying arms one towards the other, thereby transferring a lateral contact force from the wheels on to said at least one conductor.

5. The vehicle according to claim 1, wherein each rotor is provided with a return spring for maintaining a reference position of each blade when approaching the obstacle.

6. The vehicle according to claim 1, wherein each wheel has a central groove for receiving various diameters of conductors and a rounded edge for facilitating the passage of the obstacles.

7. The vehicle according to claim 1, wherein the motor means comprise electric motors and are powered by batteries.

8. The vehicle according to claim 7, wherein the batteries are rechargeable batteries of the nickel metal hydride type.

9. The vehicle according to claim 1, wherein the motor means are powered by a gas generator.

10. The vehicle according to claim 1, wherein the inspection systems comprise a camera system and a resistance measuring system.

11. The vehicle according to claim 1, wherein the vehicle is provided with four carrying arms positioned two by two on each side of the one or more conductors, each carrying arm being respectively provided with a temporary support rotor.

12. The vehicle according to claim 1, wherein the vehicle comprises four wheels, two of which are drive wheels that are powered by the motor means by means of a belt or gearings.

* * * * *